W. S. HATHEWAY.
Process and Apparatus for Making Butter.
No. 234,867. Patented Nov. 30, 1880.

Attest:
Geo. T. Smallwood Jr.
Walter Allen

Inventor:
William S. Hatheway
By Knight Bros
attys

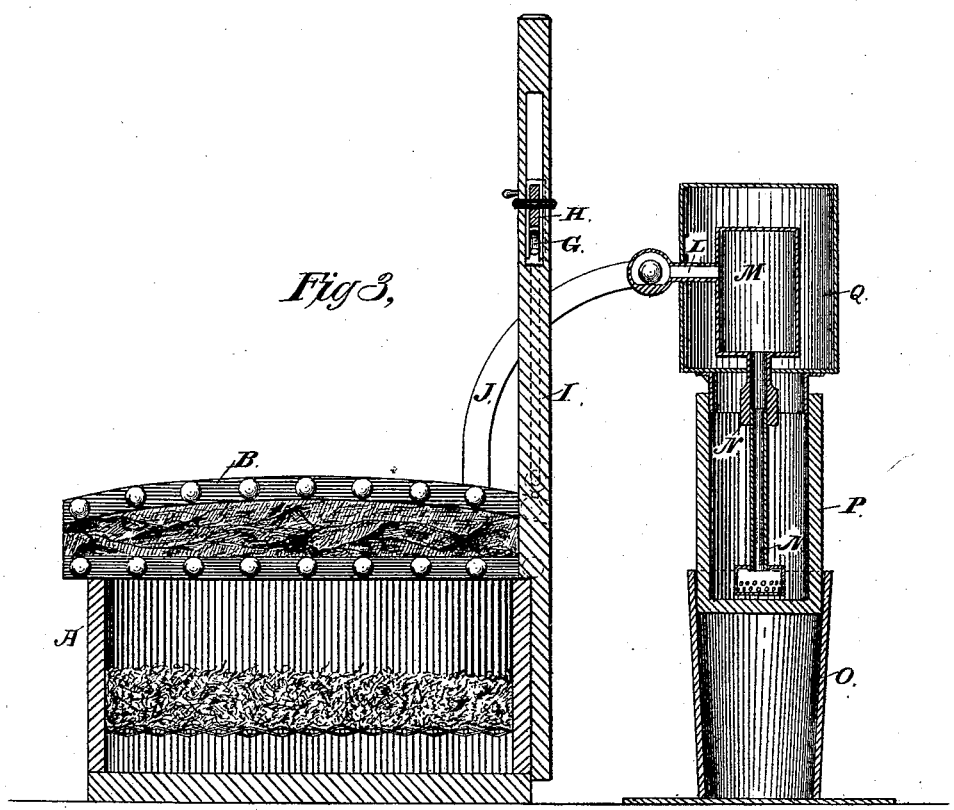

UNITED STATES PATENT OFFICE.

WILLIAM S. HATHEWAY, OF DEANSVILLE, NEW YORK.

PROCESS OF AND APPARATUS FOR MAKING BUTTER.

SPECIFICATION forming part of Letters Patent No. 234,867, dated November 30, 1880.

Application filed February 17, 1880.

*To all whom it may concern:*

Be it known that I, WILLIAM S. HATHEWAY, a citizen of the United States, residing at Deansville, in the county of Oneida and State of New York, have invented Improvements in Processes of and Apparatus for Making Butter, of which the following is a specification.

The object of my invention is to effect the prompt removal from milk of animal heat, defective odors, and all impurities; also, to effect the rapid separation of cream, the churning of cream, and the purification of butter in a granulated state. These various objects are accomplished by a pneumatic apparatus consisting of a bellows or blower of any suitable construction, straining appliances through which air is drawn so as to arrest and remove all dust and foreign matter therefrom, and a system of pipes and connections by which the air is forced in contact with cooling appliances and delivered near the bottom of milk or cream in suitable receptacles, so as to agitate it and rapidly reduce it to the temperature of the injected air, or nearly so.

The apparatus is also adapted for the warming of cream, when required, by the use of hot water instead of ice in contact with the air pipes and passages; also, for the purification or flavoring of milk by the introduction of suitable chemicals, flavors, or perfumes with the injected air.

Figure 1:
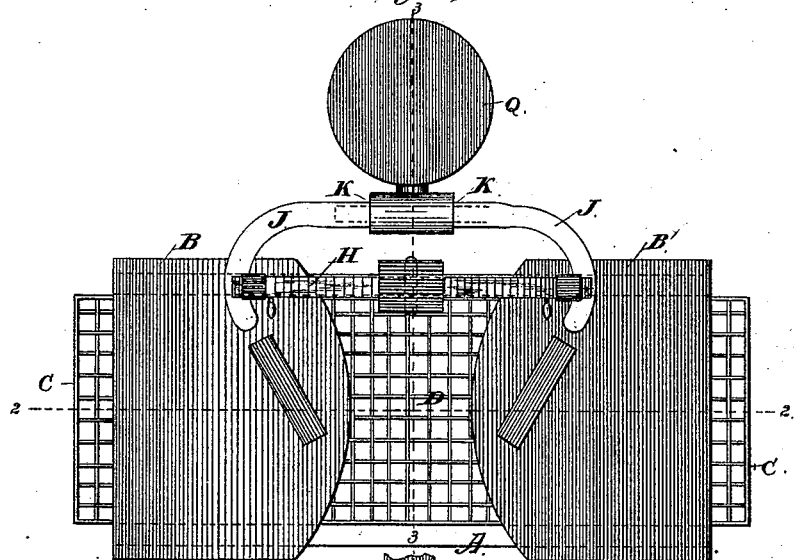
Figure 2:
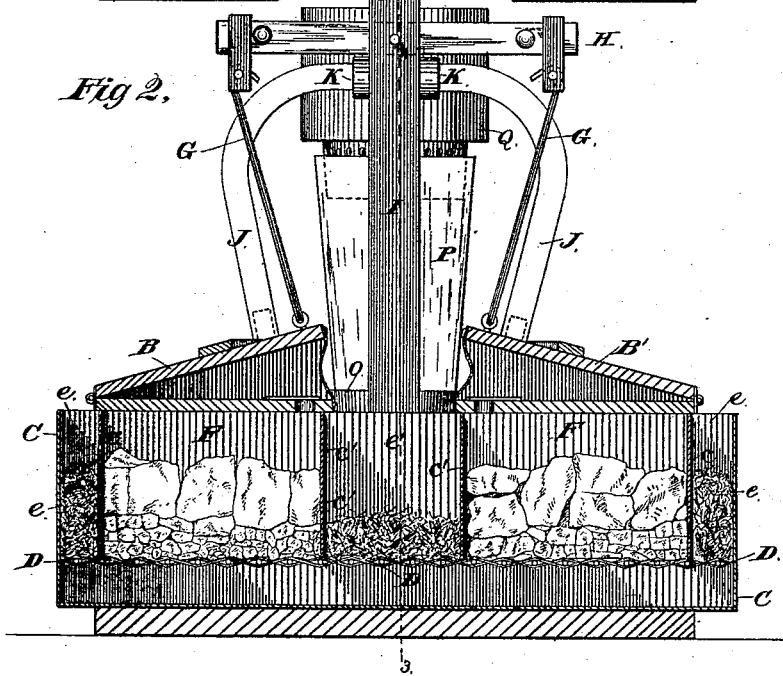

In the accompanying drawings, Figure 1 is a plan of the simple apparatus by which my invention may be carried into effect. Fig. 2 is a longitudinal section of the same on the line 2 2, Fig. 1. Fig. 3 is a transverse section on the line 3 3, Figs. 1 and 2.

A represents a hollow base supporting a pair of bellows, B B', within which, beneath the bellows, are one or more tanks, C, divided into several compartments by partitions *c c* near the ends, and *c' c'* near the center, which partitions extend from the top two-thirds of the depth of the tank, more or less, leaving an uninterrupted space at the bottom.

The tank may be made in two or more parts, if preferred, so as to be drawn out at each end of the base A. Directly beneath the partitions *c c'* is a reticulated or perforated false bottom, D, extending from end to end of the tank, so as to constitute the bottom of the several compartments into which the tank is divided by its partitions. The small end compartments, *e e*, and the central compartment, *e'*, are open to the air, while the larger compartments F F are covered by the bottoms of the bellows, against which the sides of the tank and the partitions *c c'* fit closely, so that when the bellows are worked air will be drawn upward through the chambers F F, its place being supplied by air passing freely down through the compartments *e* and *e'*, which are filled with any suitable fibrous material to strain the incoming air.

The hinged upper leaves of the bellows are connected by rods G G to a horizontal beam, H, pivoted in a standard, I, so that the bellows will have a uniform reciprocating movement. Their air is forced upward through flexible pipes J J connected with nozzles K K, valved to prevent the reflux of air, and communicating with a common pipe, L, which delivers the air into a chamber, M, from which it is discharged downward through a nozzle, N, branched or perforated at bottom in any suitable manner to suit the form and capacity of the milk pan, vat, or receptacle, P, which is here shown in the form of a simple deep pan supported on a stand, O.

The air-chamber M is contained within a reservoir, Q, employed for the reception of pounded ice when the milk is to be cooled, or for hot water when it is necessary to raise the temperature of cream in the operation of churning.

For cooling and purification of milk my apparatus is employed and operated in the following manner: The chambers F F are supplied with broken ice resting on the false bottom D, and the chambers *e e'* are filled with hemp, cotton, wool, felt, or other suitable fibrous material, for the purpose of arresting dust and other foreign matters which may float in the air. The reservoir Q is also filled with pounded ice around, beneath, and above the air-chamber M. The bellows B B' being then worked reciprocally by the feet or by any suitable power, air will be rapidly drawn through the fibrous straining material in the compartments *e e'* of the tank and upward through the chambers F F in contact with the ice therein, and forced upward through the flexible pipes J J and connecting-pipes K K L and chamber M, and delivered through the nozzle N beneath the surface of the milk, near the bottom of its containing vat or vessel P, at a temperature of about 32°, causing an ebullition and agitation of the entire body of milk and quickly reducing its temperature as low as required. At the same time the oxygen of the air eliminates all impurities in the milk, and by the use of suitable chemicals I am enabled to eliminate odors, prevent the introduction or formation of ferment spores, insuring every condition necessary or desirable to the perfection of milk or its products, and even to restore milk to a perfectly pure and sound condition after it has become deteriorated.

The agitation of milk while in the process of cooling by the removal of destructive matters and impurities throughout its body causes the cream to rise much more freely and rapidly when the milk is set.

The same apparatus is used for churning by the substitution of cream for milk in the receptacle P, the effectual agitation of the cream by the injection of air causing the rapid separation of butter without the injurious rupture of the inner cells which is caused by the impact or friction of any of the various forms of churn-dashers in common use.

In case the temperature of the cream is below that which is best adapted for churning, it is quickly tempered by the introduction of warm or hot water in the reservoir Q.

The butter having been thus separated from the cream, the buttermilk is removed, either by decantation or by being drawn off through an orifice in the bottom of the churn, after which clear cool water is introduced and the blower again operated, so as to thoroughly wash the butter without affecting its granular state. The water having been drawn off, another charge may be introduced, and so on until the butter is perfectly washed. After removing the last charge of water the butter is agitated in the same manner with a strong solution of salt, so that the whole process of making butter is accomplished by one apparatus and without once handling it or doing anything to destroy its granular condition.

Any desired flavor may be imparted to the butter by placing the flavoring material in the receptacles below the bellows.

The form of the nozzle N is varied to suit the shape and dimensions of the milk or cream receptacle P. For use with a large or long vat it is provided with branches extending toward the ends of said vats, with perforations of any necessary number and capacity.

My apparatus is of real value in the manufacture of cheese. By taking the curd in its granulated state, before it goes into the press, and placing it in a vat, P, provided with a light cover, and using grated or ground old cheese and any desired flavoring-matter in the tank C, I am enabled to force such flavoring pneumatically into the body of the curd, and thereby impart the desirable flavor to the cheese. I can thus produce cheese which will have a full ripe flavor as soon as it is made.

Having thus described my invention, the following is what I claim to be new therein and desire to secure by Letters Patent:

1. The process of manufacturing granular butter by first churning the cream pneumatically, then removing the buttermilk and substituting water therefor and again agitating pneumatically, and then salting the butter by replacing the water by brine and again agitating, as before, substantially as and for the purpose set forth.

2. The tank C, constructed with chambers for the reception of ice and fibrous material for straining the air, in combination with a suitable blower for injecting air into the milk or cream.

3. The apparatus consisting of bellows B B', tanks C, conducting-pipes J K L, chambers M, nozzle N, reservoir Q, and vat or receptacle P, for the tempering and purification of milk, substantially as herein described.

WILLIAM S. HATHEWAY.

Witnesses:
OCTAVIUS KNIGHT,
WALTER ALLEN.